Dec. 14, 1954   J. E. WOODRUFF   2,696,854
SAW TABLE GAUGE WITH VERTICALLY ADJUSTABLE STOP ELEMENT
Filed March 18, 1949
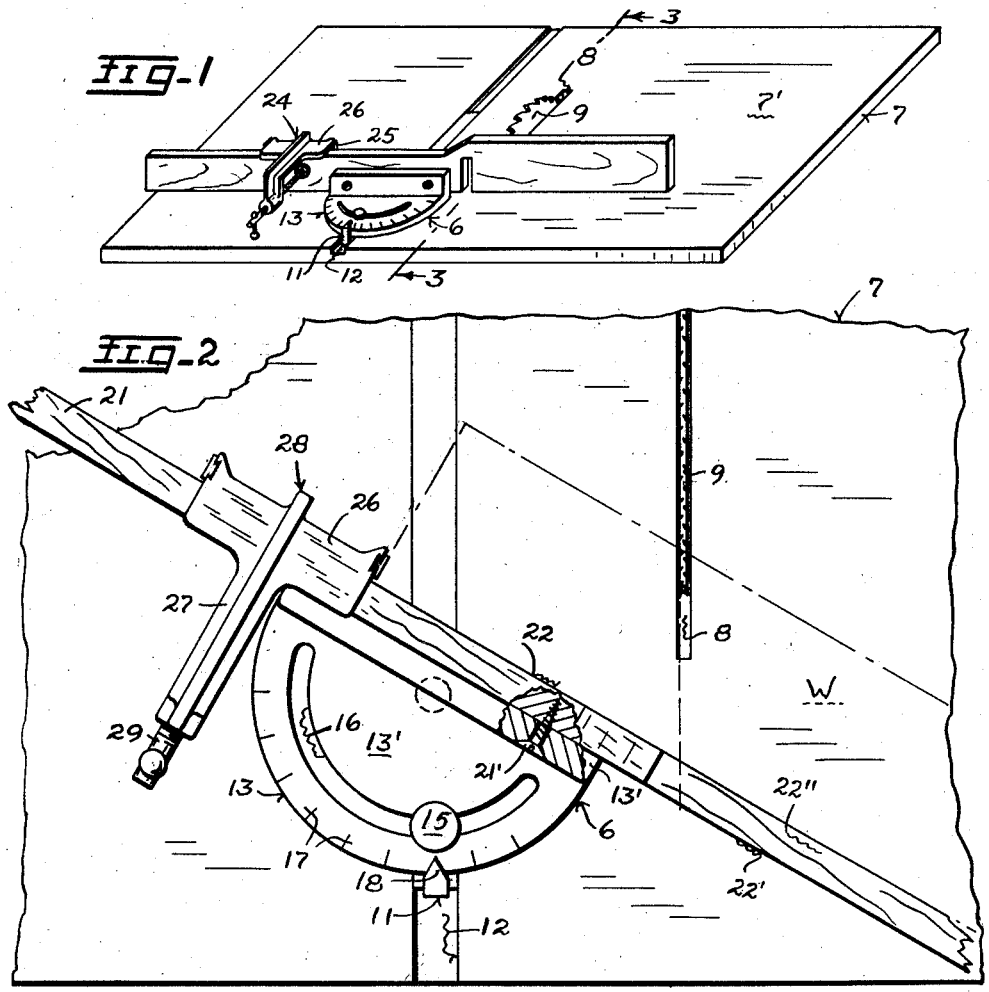
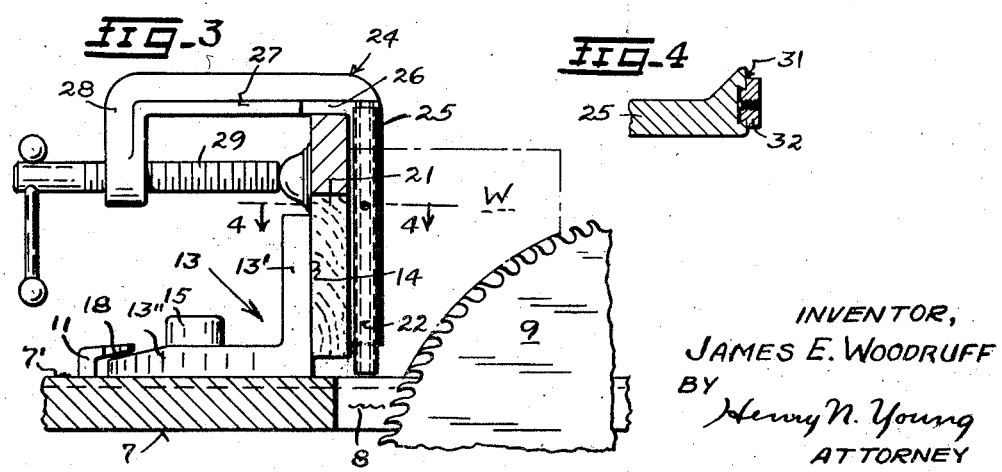
INVENTOR,
JAMES E. WOODRUFF
BY
Henry N. Young
ATTORNEY

United States Patent Office 2,696,854
Patented Dec. 14, 1954

2,696,854

SAW TABLE GAUGE WITH VERTICALLY ADJUSTABLE STOP ELEMENT

James E. Woodruff, Oakland, Calif.

Application March 18, 1949, Serial No. 82,191

2 Claims. (Cl. 143—174)

The invention relates to a work gauge for the guide block of a saw table used for cutting wood and other relatively soft materials.

A general object of the invention is to provide an improved work-gauging and work-backing attachment for a saw-table guide block for enhancing the utility of the saw.

Another object is the provision of an attachment of the character described which provides an adjustable gauging stop for the stock being cut.

A further object of the invention is the provision of a work-backing member having an adjustable stop which is especially adapted for use with relatively thin work pieces.

An added object of the invention is the provision of a guide-block attachment which is arranged to effectively back a work piece at both sides of the plane of action of the saw.

The invention possesses other objects and features of advantage, some of which, with the foregoing, will be set forth or be apparent in the following description, and in the accompanying drawings, in which, Figure 1 is a perspective view of the top of a conventional saw table showing my attachment applied to an adjustable miter guide block thereof which is set for a straight cut.

Figure 2 is an enlarged fragmentary plan view of the assembly of Figure 1, the guide block and its attachment being set for a bevel cutting of a piece of gauged length from a work-piece.

Figure 3 is an enlarged fragmentary vertical section, showing the mounted attachment as viewed from the plane of the saw in Figure 1.

Figure 4 is a fragmentary sectional detail taken at the line 4—4 in Figure 3.

For illustrating the device of my invention, I have shown a typical embodiment thereof as applied to a guide block assembly 6 reciprocably mounted on a saw table top 7 provided with a slot 8 through and from which a circular power-driven circular saw blade 9 freely extends laterally of the zone of movement of the block 6. As shown, the block 6 has a base portion 11 slidably reciprocable in a usual guide slot 12 of the table top 7 and pivotally carrying a head 13 providing a flat work-engaging face 14 which is perpendicular to the upper surface 7' of the table top, and is provided by an upstanding head portion 13' which extends integrally from a horizontal head portion 13'' swivelled to the base element 11 of the assembly 6, whereby the assembly 6 comprises a mitre guide for a workpiece.

A clamp-screw 15 extends from the base element 11 through an arcuate slot 16 provided in the head portion 13'' and having the center of its arc at the swivel axis for the head, and the edge of the head portion 13'' is cylindrically curved about the same axis whereby the portion is semi-circular in plan. Angle calibrations 17 are provided along the arcuate edge of the head portion 13 for registration with a pointer 18 carried by the base 11 for use in disposing the face 14 in angularly adjusted relation to the plane of the blade 9 for an operative application of the clamp-screw 15 to fix the head in a desired set relation. As so far described, the present saw table with saw and guide block represents a usual arrangement in the art and the gauging device of my invention is arranged to be mounted on that portion of the head 13 which provides the face 14.

The gauging device of my invention essentially includes the use of a work-backing strip 21 mounted on the upright head portion 13' of the guide block against the face 14 thereof by means of suitable attaching screws 21', the strip 21 being shown as of wood and of uniform thickness to provide a flat face 22 for the engagement of a workpiece W therealong in intersecting relation to the plane of the saw blade 9. In the present arrangement, the strip 21 extends across the zone of operation of the saw, and is of sufficient height thereat that it may be notched from below to accommodate the saw for straight or bevel cuts therewith, it being noted that the guide block assembly is entirely to that side of said zone at which the guide slot 12 is provided. The portion of the strip 21 which is at and beyond the head portion 13' is of uniform cross-section and extends somewhat above said head portion with its top edge face 22'' parallel to the table surface 7'. It will be understood that the strip 21 is usable generally for backing relatively short workpieces to be operated on by the saw.

It will now be noted that a unitary stop member 24 is provided for mounting on the strip 21 in adjusted position therealong for engagement by the end of a workpiece which is backed by the strip for its sawing. The present stop unit 24 has the general structure of a C-clamp for mounting it on the upper strip portion above the level of the head portion 13', and essentially comprises a plate-like portion 25 for flat engagement against the strip face 22, an upper portion 26 extending perpendicularly from the portion 25 and arranged for disposal against the top strip face 23, and an L-shaped arm portion extending laterally from the portion 26 and having horizontal and downturned parts 27 and 28. The part 28 threadedly carries a clamp-screw 29 extending perpendicularly to the portion 25 and arranged for turning against the opposed face 22' of the strip for clamping the member 24 to the strip in adjusted position therealong.

The upright side edge faces 31 of the portion 25 of the mounted member 24 are arranged to function as stops for workpieces disposed on the table top 7 and backed by the strip 21, the adjustable mounting of the member 24 along the strip providing for the cutting from a workpiece of pieces of predetermined lengths. Since a present stop member 24 is adapted for mounting on work-backing strips carried by guide block assemblies of various structures and height, the portion 25 thereof will usually not extend close to the upper face of a saw table with which it is used, and means are therefore preferably provided for assuring the effective extension of the faces 31 to the top surface of a mounting table top. As particularly shown, face plates 32 are provided in dovetailed relation to the sides of the portion 25 for their set adjustment in an upright direction to present their outer faces closely adjacent the top surface of the table. In this manner, the present stop member 24 is adapted for use in the cutting of relatively thin workpieces such as plywood. The provision for the use of either of the sides 31, or the face plates 32, at opposite sides of the stop portion 25 provides for the mounting and use of a present stop member 24 on the strip 21 at either side of the cutting zone of the saw blade 9.

It will be understood that the present stop member 24 may be used in both angle and bevel cutting of workpieces following appropriate angular adjustments of the guide block 6 and the saw blade 9 respectively, and so may be used universally in association with saw tables of the type illustrated and also with bandsaw and jigsaw tables if the backing strip 21 terminates at the cutting zone.

From the foregoing description taken in connection with the accompanying drawings, the advantages of the present saw table gauge will be readily understood by those skilled in the art to which the invention appertains. While I have described the principle of operation, together with arrangements which I now consider to be the preferred embodiments thereof, I desire to have it understood that the showings are primarily illustrative, and that such changes and developments may be made, when desired, as fall within the scope of the following claims.

I claim:

1. A stop attachment for a reciprocable saw-table guide head providing a relatively short guide plate portion having a flat forward face extending along and upwardly from the work-supporting face of the table top and laterally spaced from the zone of operation of the saw, comprising a relatively long guide strip providing a forward working face for engagement by a workpiece, means for releasably mounting the guide strip along and against said head face to extend longitudinally to at least the working zone of the saw, a stop-supporting member carried directly on said guide strip in longitudinally adjusted relation thereto, and a stop element mounted on said member for adjustment in a line perpendicular to the work-supporting face of the table top and providing a flat stop face for operative engagement by an end of a workpiece supported on the table and engaging the working face of the guide strip.

2. A stop attachment for a reciprocable saw-table guide head providing a relatively short guide plate portion having its top edge parallel to the top face of a mounting table top and having its work-engaging face flat and extending along and upwardly from the table top and laterally spaced from the zone of operation of the saw, comprising a relatively long guide strip providing a flat working face for engagement by a workpiece, means for releasably mounting the guide strip along and against said head face to extend upwardly of the top edge of the guide plate portion of the head and longitudinally to at least the working zone of the saw, a stop-supporting member mounted directly on the top edge of said guide strip, a clamp screw on said stop-supporting member operative against the rear face of the guide strip solely above the top edge of the guide plate portion of the head for fixing the member in longitudinally adjusted position on the guide strip, and a stop element mounted on said member forwardly of the working face of the guide strip for adjustment in a line perpendicular to the upper table face to dispose its bottom end closely adjacent the table top and providing a flat stop face for operative engagement by an end of a workpiece supported on the table and engaging the working face of the guide strip.

References Cited in the file of this patent

UNITED STATES PATENTS

| Number | Name | Date |
|---|---|---|
| 438,029 | Strahl | Oct. 7, 1890 |
| 500,972 | Stein | July 4, 1893 |
| 701,724 | Hewitt | June 3, 1902 |
| 1,092,518 | Brooks | Apr. 7, 1914 |
| 1,896,924 | Ulrich | Feb. 7, 1933 |
| 1,940,310 | Lamb | Dec. 19, 1933 |
| 2,010,882 | Ocenasek | Aug. 13, 1935 |
| 2,237,556 | Hedgpeth | Apr. 8, 1941 |
| 2,285,897 | Campbell | June 9, 1942 |
| 2,363,745 | Petersen | Nov. 28, 1944 |

FOREIGN PATENTS

| Number | Country | Date |
|---|---|---|
| 624,299 | Great Britain | June 1, 1949 |